US 012162630B2

(12) United States Patent
Haney

(10) Patent No.: US 12,162,630 B2
(45) Date of Patent: Dec. 10, 2024

(54) METHODS AND DEVICE FOR AUTONOMOUS ROCKETRY

(71) Applicant: Brian Haney, Pittsburgh, PA (US)

(72) Inventor: Brian Haney, Pittsburgh, PA (US)

(73) Assignee: Brian S. Haney, Reno, NV (US)

( * ) Notice: Subject to any disclaimer, the term of this patent is extended or adjusted under 35 U.S.C. 154(b) by 446 days.

(21) Appl. No.: 17/669,304

(22) Filed: Feb. 10, 2022

(65) Prior Publication Data

US 2023/0249847 A1    Aug. 10, 2023

(51) Int. Cl.
| | | |
|---|---|---|
| *B64G 1/00* | (2006.01) | |
| *B64G 1/36* | (2006.01) | |
| *B64G 1/62* | (2006.01) | |
| *B64G 1/24* | (2006.01) | |

(52) U.S. Cl.
CPC .............. *B64G 1/36* (2013.01); *B64G 1/62* (2013.01); *B64G 1/247* (2023.08)

(58) Field of Classification Search
CPC ............. B64G 1/247; B64G 1/36; B64G 1/62
USPC .......................................................... 701/13
See application file for complete search history.

(56) References Cited

U.S. PATENT DOCUMENTS

| | | | | |
|---|---|---|---|---|
| 10,667,398 | B1 * | 5/2020 | Petrick ................... | H05K 1/115 |
| 2011/0277446 | A1 * | 11/2011 | Stroud ...................... | F02K 9/80 |
| | | | | 60/233 |
| 2017/0267379 | A1 * | 9/2017 | Kobayakawa ........... | B64G 1/52 |
| 2021/0292011 | A1 * | 9/2021 | Limotta ................... | B64G 1/242 |
| 2022/0315253 | A1 * | 10/2022 | Kuhns ...................... | B64G 1/40 |
| 2023/0211900 | A1 * | 7/2023 | French ..................... | B64G 1/58 |
| | | | | 244/171.1 |
| 2023/0359863 | A1 * | 11/2023 | Alvord .................. | G01M 15/14 |

OTHER PUBLICATIONS

Erbas, Timucin, AI Focus Presentation, Apr. 23, 2021, Youtube. com, 1:33-3:39 (Year: 2021).*

* cited by examiner

*Primary Examiner* — Tiffany P Young
*Assistant Examiner* — Michael T Dowling

(57) ABSTRACT

Rocket control is a difficult and unpredictable task in environments with inclement weather. As a result, launch missions are often strictly limited based on weather conditions. The present invention provides a method for controlling a rocket to account for environmental uncertainties and maintain optimal mission performance. First, sensors collect data about the rocket's environment, passing the information to storage in the rocket's database. Second, the rocket's processor manipulates the database with an optimization algorithm producing instructions. Third, the instructions command the rocket's control system for an optimal end-to-end trajectory and to enable the rocket to perform a safe landing.

1 Claim, 3 Drawing Sheets

METHODS AND DEVICE FOR AUTONOMOUS ROCKETRY

BACKGROUND TO THE INVENTION

The field of the present disclosure relates to computing devices and methods for rocket control using intelligent systems. As such, the field of this invention lies at the confluence of two broader fields: rocketry and artificial intelligence. Rocketry involves the study, engineering, and construction of space vehicles launching to Earth orbit. Artificial Intelligence (AI) is a sub-field of computer science focusing on machines making decisions that mirror and replicate the human mind's thoughtful processes.

The Cold War sparked a wave of development in rocket technology, which rapidly evolved during the 1950s and 1960s. In the west, the Apollo Program gave birth to one of the greatest achievements in human history. In 1969, Neil Armstrong and Buzz Aldrin became the first people in human history to step foot on the moon as part of the Apollo 11 mission. However, mankind has not returned to lunar surface since the Apollo 17 mission in 1972.

The decades after the Apollo program were dedicated to the development of satellite and orbital infrastructure. Throughout history, satellites have advanced globalization. Indeed, consistent global satellite coverage emerged in the 1970s, fostering innovation in military and commercial applications. Simply, satellites are objects in orbit around the Earth. In 1975 there were approximately 3,500 detected objects in orbit around the earth. Still, one of humanity's most profound technological accomplishments is the existing Earth-orbiting infrastructure of satellites.

Today, there are more than 6,000 satellites in orbit. Moreover, the modern satellite infrastructure is now an indispensable feature of modern humanity. Consider satellites power telecommunications networks, global positioning systems, and climate monitors. As a result, today's existing Earth-orbiting infrastructure of satellites is undoubtably one of humanity's most profound technological accomplishments.

Most satellites are concentrated in one of three orbital zones: geostationary orbit (GEO) 22,300 miles above sealevel; medium Earth orbit (MEO) 11,000-12,000 miles above sea-level; and low Earth orbit (LEO) 100-1,200 miles above sea-level. In practice, most LEO satellites orbit between 200-600 miles altitude, after which are the strongest parts of the Van Allen Belts, which are radioactive zones with charged particles surrounding Earth. Generally, networks of satellites and ground stations provide three main benefits including: global navigation; global communication; and intelligence information.

Launching satellites to orbit required a rapid evolution of rocket technology. Still, despite structural differences, all rockets need an engine to generate thrust for liftoff. As such, rocket propulsion systems apply force to a vehicle which accelerates velocity. Rocket engines generally include a vessel with a nozzle, a combustion chamber with propellant, and an ignition system which ignites the propellant. Additionally, rocket engines may also include a coolant system or protective shield, depending on the engine type.

Additionally, all rocket's need a control system for steering the trajectory to space and in some cases, back to Earth. The rocket's control systems include the attitude control system, reaction control system, and other software part specific control systems. The reaction control system controls the rocket's response to the environment in which it operates. Additionally, an attitude control system allows reductions in thruster output using vectorized controls, to manipulate the rocket's position. A thruster is an object generating thrust to propel the rock with output generating force. During flight, thruster commands control and manipulate rocket positioning including roll, pitch, yaw, and attitude.

The state of the art in rocket control hardware is the field programmable gate array (FPGA), an integrated circuit designed to be configured by a designer after manufacturing. The FPGA configuration usually runs on a hardware description language, similar to other computer languages used in integrated circuits. From an architectural perspective, FPGAs contain an array of programmable logic blocks and reconfigurable connectors, for wiring logic blocks together. As such, FGPAs provide flexible hardware structures, which optimize tradeoffs between circuit building blocks, including performance, efficiency, and costs. Additionally, for space applications, FPGAs must be radiation hardened to combat radiation effects in space.

FGPAs typically have both memory and processing capabilities, to support dynamic programming techniques and operations. In short, FPGAs are modularized logic unit arrays with interconnection resources. The utility for engineers is a configurable array of uncommitted gates with uncommitted wiring channels, which allows for custom application. Each logic unit can be programmed to implement a particular logic function. To implement a particular circuit function, the appropriate connections are programmed for implementation by mapping the circuit to an array and configuring the necessary wiring connections. In fact, logic blocks can be configured to perform complex convolutional functions. For example, an FGPA may be embedded with a convolutional computer program for processing data to allow computer vision.

Rocket sensing systems may include a variety of data sensors such as cameras and LIDAR systems. LIDAR systems include of a transmitter and a receiver. The transmitter includes a laser and a beam expander to set the outgoing beam divergence. The receiver includes a telescope to collect backscattered signal, and appropriate optics to direct the return signal from the telescope to a detector, which records the signal. LIDAR sensors transmit infrared light pulses, which travel to the nearest object and backscatter to the receiver to record a measurement. One key challenge in rocketry is to unify rocket sensing systems and intelligent control systems.

Developing as a new stream of research with applications for autonomous control, AI refers to computer systems replicating human thoughtful processes and directed behavior. AI is a field uniquely positioned at the intersection of several scientific disciplines including computer science, applied mathematics, and neuroscience. The AI design process is meticulous, deliberate, and time-consuming—involving intensive mathematical theory, data processing, and computer programming. A specific field within AI, machine learning technologies drive the bleeding edge in innovation.

For computer vision, the state of the art in AI technologies is the Convolutional Neural Network (CNN), a deep learning mechanism for computer vision. The human visual system is the inspiration for the CNNs architectural design. In human vision light enters the eye through the cornea, passing to the lens. As light passes through the lens, the light is convoluted and transferred to the retina. As a mathematical operation, convolution uses two matrices: an input matrix and a kernel. This convolutional operation inspires the architecture for computer vision systems.

Additionally, CNNs contain convolutional layers with learnable parameters. Each kernel is convolved across an input matrix and the resulting output is called a feature map. The full output of the layers is obtained by stacking all of the feature maps to create dimensionality. Classification and state space assignment are common CNN functions. For example, a CNN may classify objects or areas based upon their similarity. In fact, CNNs are specifically used in computer vision because of their ability to map the locality of data. Indeed, a common computer vision data type is data from a Light Detection and Ranging Device ("LIDAR"). In short, LIDAR is a type of optical radar sensor with a transmitter and a receiver, calculating distances and generating environmental data using a laser and the constancy of light speed. CNNs are the cutting edge in computer vision, but reinforcement learning is state of the art in machine decision making.

Reinforcement learning programs contain three elements: 1) model: the description of the agent-environment relationship; 2) reward: the agent's goal; and a 3) policy: the way in which the agent makes decisions. In reinforcement learning, the environment represents the problem. An agent is an algorithm solving the environment or problem. The reward acts as a feedback mechanism, allowing the agent to learn independent of human training. Generally, an optimal policy is developed to maximize value. The optimal policy is developed using a statistical system for machine learning called training, where the software program iterates toward better performance. Performance is defined according to optimal metrics similar to getting a high score in a computer game, using a value function.

A value function may be used to compute the value of a given state and action according to a defined policy. In other words, the value function computes the best decision according to a policy. For example, the value function is equal to the expected sum of the discounted rewards for executing policy over the entire environment, called the episode. The expected future rewards are discounted with a discount factor. The discount factor is typically defined between zero and one. If the discount factor is low, the agent considers present rewards to be worth more and if the discount factor is high, future rewards are worth more—relatively speaking.

The goal for reinforcement learning programming is to identify and select the policy which maximizes expected reward for an agent acting in an environment. In the robotics context, this policy may be captured in a computer program and embedded to hardware for processing and control. Policy evaluation is the process of computing the expected reward from executing a policy in a given environment, which can be used in a general process called policy iteration for computing an optimal policy. In doing so, the agent may take actions in real-time according to a defined policy optimizing control metrics.

Convergent systems are machines capable of sensing their environment and achieving goals, representing the integration of machine decision and perception technologies. Deep reinforcement learning technologies, a specific type of convergent system, are machine learning techniques resulting from a technical convergence in reinforcement and deep learning technologies. Deep reinforcement learning systems have three capabilities that set them apart from all previous AI systems: generalization; learning; and intelligence.

Deep reinforcement learning is a new type of machine learning resulting from the technical convergence of two more mature machine learning methods, deep learning and reinforcement learning. Generally, there are three different frameworks for deep reinforcement learning: q-networks, policy optimizers, and actor-critic. Q-networks are neural networks embedded in the reinforcement learning architecture using q-learning for predicting rewards, a reinforcement learning technique for training agents. Another example, policy optimizers, iterate toward an optimal policy using a neural network to predict policy performance progress. A third deep reinforcement learning variant is the actor-critic framework which uses an actor neural network and critic neural network to optimize an agent's action selection.

Until the early part of the twenty-first century, rockets were fully expendable, meaning they could only be used once. The major innovation of modern rocket technology is the reusable rocket. The innovation is well displayed in launch price-performance. From a financial perspective rockets are much like jets because the fuel of a trip is only a small fraction of the cost. So, the major cost of launching a payload into orbit is the rocket itself. By making rockets reusable, like jets, the cost-efficiency of spaceflight is experiencing order of magnitude improvements.

As rocket technology evolves to support point-to-point, orbital, and extraterrestrial missions, safety in landing rockets is critical. Moreover, rocket landing is a difficult, stochastic, and unpredictable task, especially in environments with inclement weather. Therefore, launch missions are often strictly limited based on weather. Limiting launch based on time windows is expensive, causing delays for contractors and Government agencies.

Current methods for optimizing trajectory for rockets utilize optimization techniques based on deterministic environments but are unable to generalize about changes in dynamic or uncertain environments. Thus, there exists a need for control devices and methods which can generalize about environmental uncertainties, enabling point-to-point rocket control. As such, the present disclosure is tailored toward optimizing rocket control from launch to landing using deep reinforcement learning to maximize safety and landing performance in uncertain environments caused by inclement weather or other dynamics.

SUMMARY OF THE INVENTION

Rocket control is a difficult and unpredictable task in environments with inclement weather. As a result, launch missions are often strictly limited based on weather. However, the problem is there is no way for a rocket's control system to generalize about uncertainty in its environment for instantaneous adjustment. The present invention provides methods for controlling a rocket to account for stochastic dynamics and maintain optimal performance.

In certain embodiments of the present disclosure, first, sensors collect data about the rocket's environment and stored in the rocket's database. The sensors may collect various forms of data including GPS, LiDAR, Camera, and Radio Frequency Signals. Second, the rocket's processor manipulates the database with a deep reinforcement learning algorithm producing instructions. The deep reinforcement learning algorithm may control thrust output by manipulating the rocket's control system. Third, the instructions command the rocket's reaction control system for optimal control. The optimal control for the rocket is defined by ideal trajectory metrics.

In certain embodiments, the present disclosure is a method for rocket control. The method comprises a rocket, data sensors conveying data to a database and processor, a convolutional neural network processing data from the database for computer vision and environmental sensing. The convolutional neural network integrates with a deep reinforcement learning algorithm. The deep reinforcement learning algorithm processes the data from the convolutional neural network and produces commands for thrust vector valve manipulation. The deep reinforcement learning algorithm is a simulation trained software using artificial intelligence to generalize about data and statistically select actions corresponding to commands. The commands manipulate the thrust vector valves, and the thrust vector valves control thruster output to optimize rocket control for landing performance.

In certain embodiments, the present disclosure is a computing device for commanding a reaction control system. The computing device comprises a simulation trained artificial intelligence computer program, embedded in a radiation hardened processor. The radiation hardened processor further comprises at least one graphics processing unit, storing at least one artificial intelligence computer program processing real time sensor data, generalizing about the rocket's trajectory environment, and storing at least one deep learning program to optimize commands for reaction control. The commands controlling thrust vectors for the rocket, wherein wiring connects the radiation hardened processor to the rocket's thrust vectors further comprising a fuel injector, injecting fuel to one or more engines according to the commands produced by the deep learning computer program. The deep learning computer program further comprises at least one neural network.

In certain embodiments, the present disclosure is a method for intelligent rocket trajectory control. The method comprises a rocket, launching from a launch pad, following an optimal trajectory, using sensors to assess position, recording sensor data to a database and computer processor. The database and processor are stored on board the rocket, the processor further processes the data using convolutional neural networks. The convolutional neural networks generate a point cloud environment. A reinforcement learning agent further processes the point cloud environment for action oriented commands using a reinforcement learning agent to manipulate the rocket's control system to adjust deviations from the flight path and optimize trajectory.

DETAILED DESCRIPTION OF THE INVENTION

Figure 1:
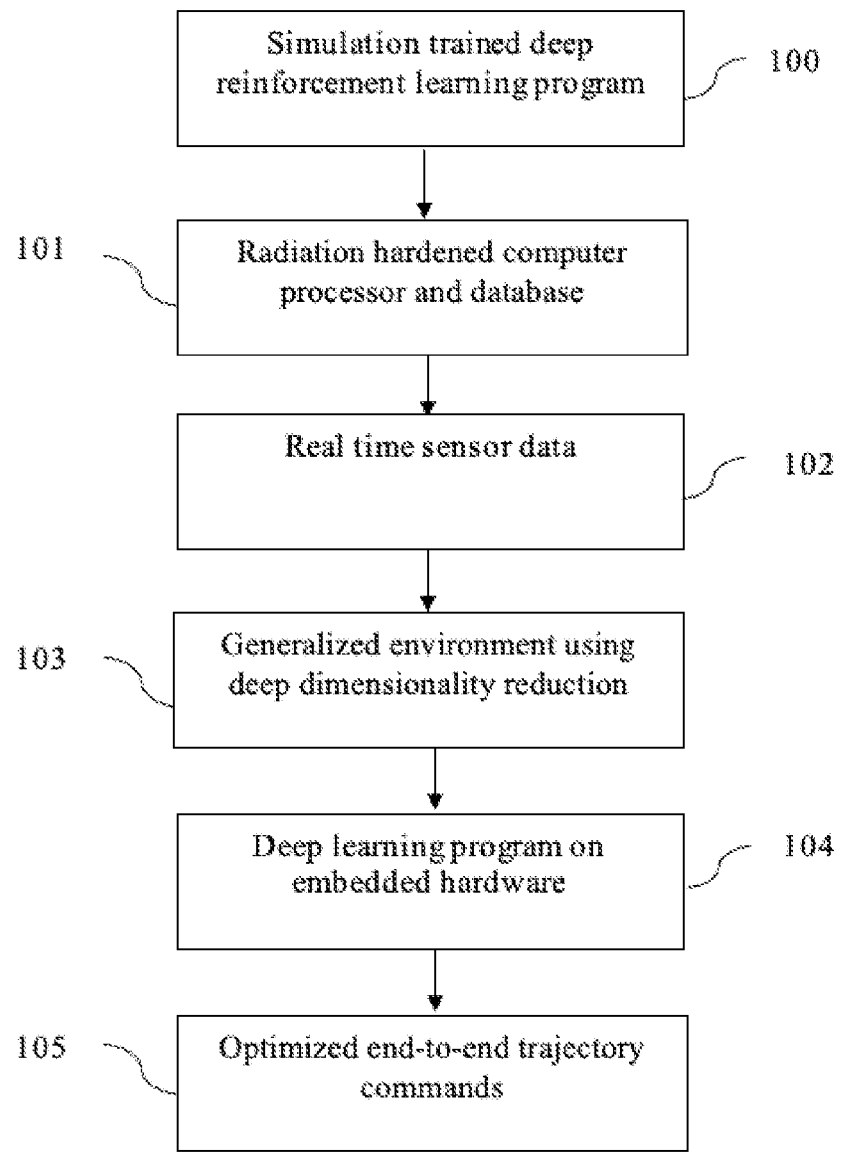
FIG. 1 illustrates embodiments of the present disclosure as an information flow model using a deep learning program for reaction control.

FIG. 1 illustrates embodiments of the present disclosure as an information flow model using a deep learning program for reaction control. In certain embodiments, the present disclosure is a process for autonomous rocketry including a simulation trained deep reinforcement learning computer program 100. In certain embodiments, the deep reinforcement learning computer program may be embedded to a radiation hardened processor and database 101. The database and processor may receive real time data regarding the rocket's environment 102, further processing the data to generalize about uncertainty to make control decisions 103 using a deep learning program 104. In such embodiments, the rocket's end-to-end trajectory is optimized according to intelligent commands from the deep learning algorithm 105.

Figure 2:
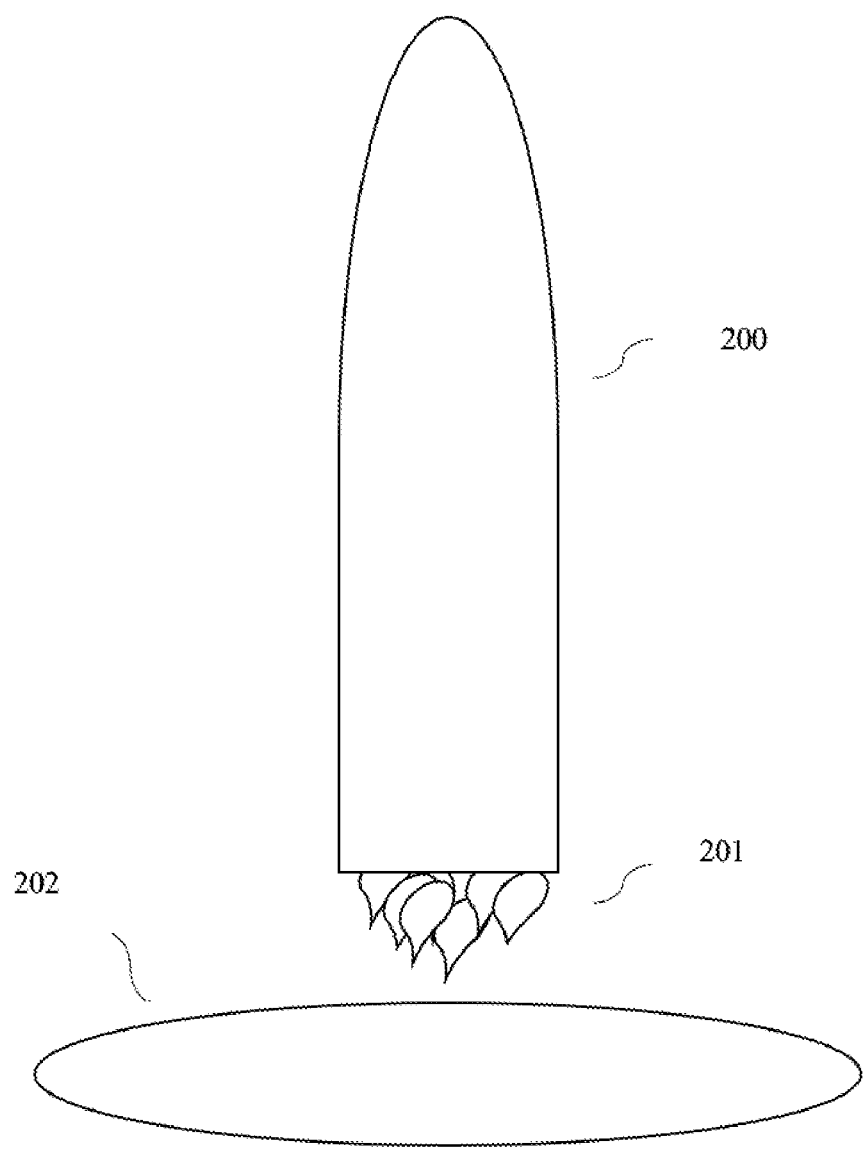
FIG. 2 illustrates embodiments of the present disclosure where a rocket is landing on a landing pad autonomously.

FIG. 2 illustrates embodiments of the present disclosure where a rocket is landing on a landing pad autonomously. In certain embodiments, the present disclosure is a process for end-to-end rocket trajectory optimization, including a rocket starting on a launch pad, autonomously launching. In such embodiments, the rocket autonomously follows an optimized trajectory path to orbit, where the rocket reaches orbit and travels to a return point. Next, the rocket reorients its position to return to Earth using a control system autoactivating for landing control 200. Then, the rocket performing a vertical powered landing 201 in a landing zone 202.

Figure 3:
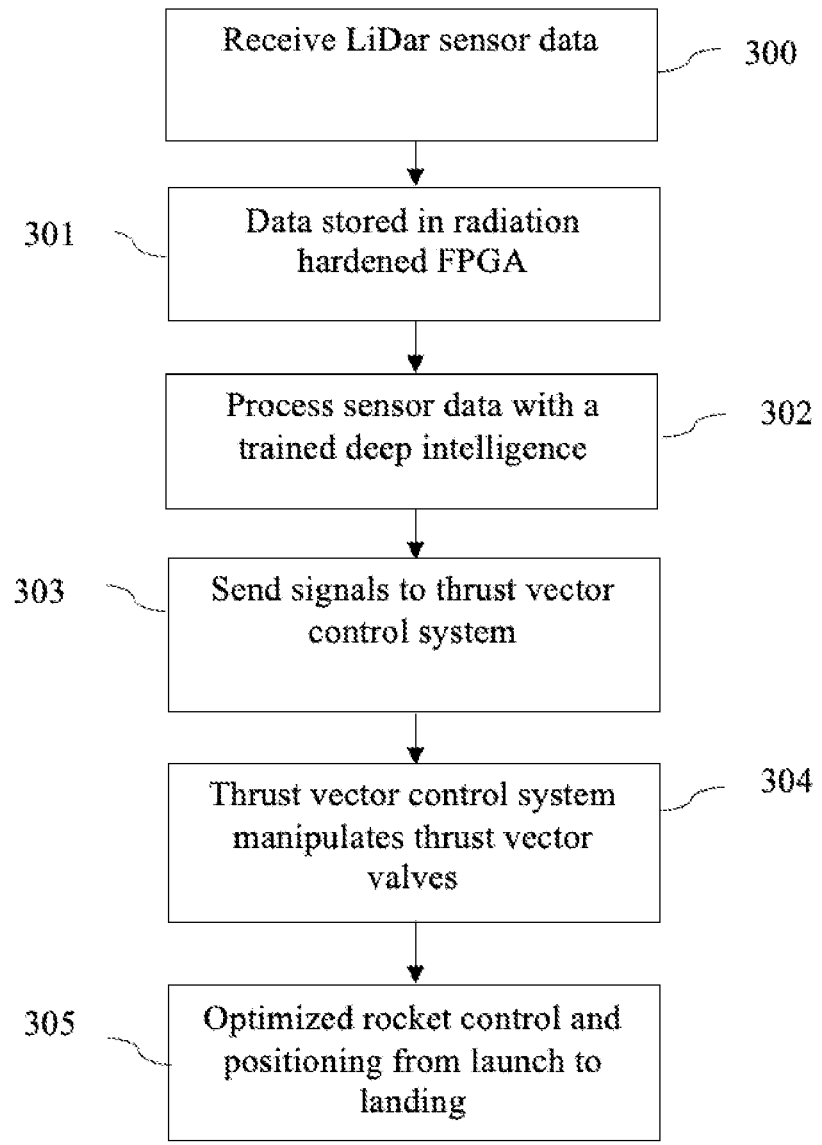
FIG. 3 describes embodiments of the present disclosure as an information flow model for receiving sensor data.

FIG. 3 describes embodiments of the present disclosure as an information flow model for receiving sensor data. In certain embodiments of the present disclosure, an onboard database and processor receive LIDAR sensor data 300 from LIDAR sensors on the rocket. The data is then stored in radiation hardened FPGA 301 which processes the sensor data with a trained deep intelligence 302. The deep intelligence then sends signals to the thrust vector control system 303. In turn, the thrust vector control system manipulates thrust vector valves 304. As a result, the rocket's control is optimized from launch to landing 305.

In certain embodiments, the present disclosure is a process for autonomous rocketry including a simulation trained deep reinforcement learning computer program 100. In certain embodiments, the deep reinforcement learning computer program may be embedded to a radiation hardened processor and database 101. The database and processor may receive real time data regarding the rocket's environment 102, further processing the data to generalize about uncertainty to make control decisions 103 using a deep learning program 104. In such embodiments, the rocket's end-to-end trajectory is optimized according to intelligent commands from the deep learning algorithm 105.

In certain embodiments, the present disclosure is a process for end-to-end rocket trajectory optimization, including a rocket starting on a launch pad, autonomously launching. In such embodiments, the rocket autonomously follows an optimized trajectory path to orbit, where the rocket reaches orbit and travels to a return point. Next, the rocket reorients its position to return to Earth using a control system autoactivating for landing control 200. Then, the rocket performing a vertical powered landing 201 in a landing zone 202.

In certain embodiments of the present disclosure, an onboard database and processor receive LIDAR sensor data 300 from LIDAR sensors on the rocket. The data is then stored in radiation hardened FPGA 301 which processes the sensor data with a trained deep intelligence 302. The deep intelligence then sends signals to the thrust vector control system 303. In turn, the thrust vector control system manipulates thrust vector valves 304. As a result, the rocket's control is optimized from launch to landing 305.

In certain embodiments, the present disclosure is a device for commanding a reaction control system. The device comprises a simulation trained artificial intelligence program, which operates on a radiation hardened processor. The artificial intelligence program processes real time sensor data and generalizes about the rocket's trajectory environment 104. Specifically, in certain embodiments, the artificial intelligence program using a deep learning program to optimize commands for end-to-end trajectory. In such embodiments, the artificial intelligence computer program produces commands that control thrust vectors for the rocket. In such embodiments, the thrust vectors also may include a fuel injector, injecting fuel to one or more engines according to the commands produced by the deep learning program 302.

In certain embodiments, the present disclosure is a method for rocket control. In such embodiments, the method includes a rocket with several LIDAR or other data sensors, which record information about the rocket's environment in real time 300. The LIDAR and other data sensors may then transmit the data to a database and processor 301. The processor may in certain embodiments include and embedded machine learning algorithm, using a convolutional neural network to generate an accurate point cloud environment. Additionally, in certain embodiments, the processor may include a second machine learning algorithm, such as a deep reinforcement learning algorithm for producing commands for thrust vector valve manipulation 304.

In certain embodiments, the present disclosure is a process for autonomous rocket trajectory control 105. In such embodiments, the process involves a rocket, launching from a launch pad and following an optimal trajectory to orbit. The rocket reaches orbit, delivers a payload, and then reorients before returning to Earth at a landing in a landing zone 202. In such embodiments, the rocket may use sensors to assess position 300, recording sensor data to a database and computer processor. The processor may process the data using an artificial intelligence computer program with further processing for action-oriented commands using a reinforcement learning agent to manipulate the rocket's control system, optimizing trajectory until the rocket's landing 201.

In certain embodiments, the present disclosure utilizes various hardware components. For example, certain embodiments include mounting a radiation hardened field programmable gate array (FGPA) on the rocket 101, with wiring connections to various thrust chambers. In certain embodiments, the FGPA may contain both a central processing unit and graphics processing unit to perform computations. Commands from the FGPA move to control vector units which may open and close thrust chambers on the rocket, or limit thrust output to a certain degree 304.

In certain embodiments of the preset disclosure, the FGPA may be embedded with a deep learning algorithm 104. The embedded deep algorithm may be expressed as software code written in one of several programming languages, including Python, C, C++ or other machine code. The deep learning algorithm may be trained in a simulation environment before being embedded to the hardware processor 100. Throughout the mission, the algorithm may correct for differences in the actual flight path and the optimal flight path by issuing commands corresponding to thrust vector control.

In certain embodiments, the present disclosure may converge hardware and software components including both a radiation hardened FGPA and a deep reinforcement learning algorithm, which may be fastened in the rocket to control the rocket's thrust output 304. In certain embodiments, electric wiring from the FGPA may carry signals from the deep reinforcement learning control algorithm to fuel injectors throughout the point-to-point journey 303. In such embodiments, the entire trajectory, from launch to landing may be controlled by the deep reinforcement learning control algorithm manipulating thrust vector commands corresponding to thrust output.

In certain embodiments, the present disclosure may include sensors collecting data about the rocket's environment 102. The sensor data may be processed and stored in the rocket's database, and subsequently processed by convolutional neural networks to create a digital environment 103. The sensor data may be further processed and manipulated by a reinforcement learning agent, which performs optimal control commands to manipulate rocket trajectory 305.

In certain embodiments, the present disclosure may include the hardware for the rocket may use a niobium alloy metal with a protective heat shield for the rocket body 200. In such embodiments, the inside of the rocket is made up of a chemical propellant engine, with thrust chambers relaying force through a nozzle. The control systems are embedded on a radiation hardened processor 301 with electrical wiring sending signals throughout the rocket 303.

In certain embodiments, the present disclosure may be composed of three parts, reflecting the three flight stages, which include launch, powered flight, and landing 201. In each stage, a separate software component may control the rocket to optimize safety and performance for point-to-point travel. Moreover, in such embodiments the software stack embedded in the rocket's hardware processors includes convolutional neural networks, reinforcement learning agents, and integrated deep reinforcement learning systems 104. In embodiments, the disclosure provides a way to unify computer perception and decision-making technologies for point-to-point rocket control in a singular system 302. In doing so, the methods marry software code for deep learning and reinforcement learning technologies which collaboratively control the rocket from liftoff to landing.

In certain embodiments, the present disclosure includes LiDAR sensors gathering real-time data about the rocket's environment which is stored in an on-board database and processed with a deep reinforcement learning algorithm producing instructions to optimize rocket control in uncertain environments including inclement weather conditions 100. In embodiments, the hardware components for the rocket include embedding LiDAR sensors on the rocket, which gather data relating to the rocket's environment. The data collected is routed to an on-board hardware processor with electrical wiring, which allows the data to be processed to create a virtual environment 103. Further electrical wiring connects the on-board hardware processor to thrust chamber valves which command and control propellant injectors.

In certain embodiments, the present disclosure includes using LiDAR sensors 300 for perception includes convolutional neural networks 302 for generating a digital environment. Programming code for the convolutional neural networks may be written in various programming languages including Python, C, and C++ depending on mission need. The software may be developed in a simulation environment prior to flight and subsequently embedded to the rocket's on-board processor 104.

In certain embodiments, the present disclosure provides a way to unify computer vision and decision-making technologies using LiDAR sensors 300 and trained deep reinforcement learning algorithms 100 to process data in real-time and effectively command rocket control systems 105. In such embodiments, the software may be developed using simulation data and subsequently embedded to a hardware processor prior to flight 104. The combined hardware-software stack may be optimized for point-to-point mission performance with considerations to both efficiency and safety.

In certain embodiments, the disclosed methods include data sensors gathering real-time data about the environment 102. The data may be stored in an on-board database 101, projected to a point-cloud environment modeling the physical world in real time. The data is further processed with a deep intelligence algorithm 104 controlling the rocket through command sequences corresponding to thruster command controls to manipulate rocket positioning including roll, pitch, yaw, and attitude 105.

In certain embodiments, the present disclosure may use hardware such as a radiation hardened processor using graphics processing units to process data. For example, certain embodiments include mounting a radiation hardened FGPA on the rocket, with wiring connections to various thrust chambers. The FGPA may contain both a central processing unit and graphics processing unit to perform computations. Commands from the FGPA move to control 301 vector units which may open and close thrust chambers on the rocket, or limit thrust output to a certain degree. The FGPA may be connected throughout the rocket and to sensors with various electrical wirings for transmitting data. Data sensors collecting information may include LiDAR 300, cameras, video, radio, or inertial instruments.

In embodiments the software control system utilizes artificial intelligence programs 104 processing data in real time to command the rocket through space 105. For example, the point cloud environment may be processed with convolutional neural networks predicting probabilities and assigning associated actions to optimize the rocket's trajectory. In certain embodiments, the digital point-cloud provides real-time data regarding the rocket's environment from liftoff to landing. In processing the point-cloud data, the rocket's software stack iteratively produces commands corresponding to thrust vector controls 304 for manipulating the rocket to ensure safety and efficiency 305.

In certain embodiments of the disclosure, a rocket launches a satellite to orbit and returns to Earth. During return, an autonomous control system activates with the push of a button. Once activated, the control system autonomously commands the rocket by processing real time data 102 about the landing zone and adapting the rocket's mechanics, positioning, and trajectory accordingly by manipulating the rocket's thrust vector output 304. Multiple LiDAR sensors, GPS sensors, and inertial navigation sensors on the rocket, landing pad, or other locations like drones or ships, to create a 3D point-cloud environment may record data for processing. In real time, a convolutional neural network identifies the landing zone performing the rocket's vision function. Meanwhile, an embedded reinforcement learning agent maximizes a reward function defining optimal landing metrics including distance, time, and impact trajectory and force 201.

In certain embodiments, the disclosed methods include LiDAR sensors 300 gathering real-time data about the rocket's environment 102. The data is stored in an on-board database and processed with a deep reinforcement learning algorithm producing instructions to optimize rocket control in uncertain environments including inclement weather conditions. In embodiments, the hardware components for the rocket include embedding LIDAR sensors on the rocket, which gather data relating to the rocket's environment. The data collected is routed to an on-board hardware processor with electrical wiring, which allows the data to be processed to create a virtual environment. Further electrical wiring connects the on-board hardware processor to thrust chamber valves which command and control propellant injectors and thrust vector valves to optimize the rocket's control during landing 201.

In certain embodiments, the present disclosure is a method for rocket control. The method comprises a rocket, data sensors conveying data to a database and processor, a convolutional neural network processing data from the database for computer vision and environmental sensing. The convolutional neural network integrates with a deep reinforcement learning algorithm. The deep reinforcement learning algorithm processes the data from the convolutional neural network and produces commands for thrust vector valve manipulation. The deep reinforcement learning algorithm is a simulation trained software using artificial intelligence to generalize about data and statistically select actions corresponding to commands. The commands manipulate the thrust vector valves, and the thrust vector valves control thruster output to optimize rocket control for landing performance.

It is to be understood that while certain embodiments and examples of the invention are illustrated herein, the invention is not limited to the specific embodiments or forms described and set forth herein. It will be apparent to those skilled in the art that various changes and substitutions may be made without departing from the scope or spirit of the invention and the invention is not considered to be limited to what is shown and described in the specification and the embodiments and examples that are set forth therein. Moreover, several details describing structures and processes that are well-known to those skilled in the art and often associated with rockets and rocket trajectories or other launch vehicles are not set forth in the following description to better focus on the various embodiments and novel features of the disclosure of the present invention. One skilled in the art would readily appreciate that such structures and processes are at least inherently in the invention and in the specific embodiments and examples set forth herein.

One skilled in the art will readily appreciate that the present invention is well adapted to carry out the objectives and obtain the ends and advantages mentioned herein as well as those that are inherent in the invention and in the specific embodiments and examples set forth herein. The embodiments, examples, methods, and compositions described or set forth herein are representative of certain preferred embodiments and are intended to be exemplary and not limitations on the scope of the invention. Those skilled in the art will understand that changes to the embodiments, examples, methods and uses set forth herein may be made that will still be encompassed within the scope and spirit of the invention. Indeed, various embodiments and modifications of the described compositions and methods herein which are obvious to those skilled in the art, are intended to be within the scope of the invention disclosed herein. Moreover, although the embodiments of the present invention are described in reference to use in connection with rockets or launch vehicles, ones of ordinary skill in the art will understand that the principles of the present inventions could be applied to other types of aerial vehicles or apparatus in a wide variety of environments, including environments in the atmosphere, in space, on the ground, and underwater.

The invention claimed is:

1. A method for rocket control, the method comprising:
   processing computer vision data from a database for computer vision and environmental sensing by a convolutional neural network, wherein the convolutional neural network is integrated with a deep reinforcement learning algorithm;
   processing output data from the convolutional neural network and producing commands for thrust vector valve manipulation by the deep reinforcement learning algorithm;
   generalizing about the output data and statistically selecting actions corresponding to the commands by a proximal policy optimization algorithm;

controlling thrust vector valves by the statistically selected actions selected by the proximal policy optimization algorithm.

* * * * *